(12) United States Patent
Balzer et al.

(10) Patent No.: US 7,304,119 B2
(45) Date of Patent: Dec. 4, 2007

(54) COPOLYMERIZABLE PHOTOINITIATORS FOR UV-CROSSLINKABLE ADHESIVES

(75) Inventors: Wolf-Dieter Balzer, Frankenthal (DE); Ulrich Erhardt, Ladenburg (DE); Volker Ladenberger, Schwetzingen (DE); Harald Meyer, Wachenheim (DE); Bernd Bruchmann, Freinsheim (DE); Karl-Heinz Schumacher, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 442 days.

(21) Appl. No.: 10/492,353

(22) PCT Filed: Oct. 4, 2002

(86) PCT No.: PCT/EP02/11109

§ 371 (c)(1),
(2), (4) Date: Apr. 13, 2004

(87) PCT Pub. No.: WO03/033544

PCT Pub. Date: Apr. 24, 2003

(65) Prior Publication Data

US 2004/0249186 A1  Dec. 9, 2004

(30) Foreign Application Priority Data

Oct. 16, 2001  (DE) ................ 101 50 486

(51) Int. Cl.
*C08G 18/00* (2006.01)
*C08G 69/00* (2006.01)

(52) U.S. Cl. ................ 528/44; 528/271; 526/317.1

(58) Field of Classification Search ............ 526/317.1, 526/316, 319, 313
See application file for complete search history.

(56) References Cited

U.S. PATENT DOCUMENTS 4,224,454 A    9/1980  McDowell et al.
4,544,625 A  * 10/1985  Ishimaru et al. ......... 430/284.1

FOREIGN PATENT DOCUMENTS

| DE | 2 411 169 | 9/1974 |
| EP | 0 246 848 | 11/1987 |
| EP | 0 346 788 | 12/1989 |
| EP | 0 377 199 | 7/1990 |
| GB | 2280905 | * 2/1995 |
| JP | 01 230603 | 9/1989 |
| WO | 95/04760 | 2/1995 |
| WO | 96/20919 | 7/1996 |

* cited by examiner

*Primary Examiner*—Karl Puttlitz
(74) *Attorney, Agent, or Firm*—Oblon, Spivak, McClelland, Maier & Neustadt, P.C.

(57) ABSTRACT

The invention relates to radically copolymerizable acetophenone or benzophenone derivatives, which may be obtained by reacting a) acrylic or methacrylic compounds, which contain at least one isocyanate-reactive group [compounds a)], with b) compounds, which contain at least two isocyanate groups [compounds b)] and c) acetophenone or benzophenone derivatives, which contain at least one isocyanate-reactive group [compounds c)]. Said invention also relates to copolymers, which contain said copolymerizable photoinitiators, as well as to the use of said copolymers in UV-crosslinkable substances, in particular hot-melt pressure-sensitive adhesives.

13 Claims, No Drawings

COPOLYMERIZABLE PHOTOINITIATORS FOR UV-CROSSLINKABLE ADHESIVES

The invention relates to radically copolymerizable acetophenone or benzophenone derivatives (referred to below as "copolymerizable photoinitiators" for the sake of brevity), obtained by the reaction of
- a) (meth)acrylic compounds, having at least one isocyanate-reactive group [compounds a)] with
- b) compounds having at least two isocyanate groups [compounds b)] and
- c) acetophenone or benzophenone derivatives having at least one isocyanate-reactive group [compounds c)].

The invention also relates to copolymers which contain the copolymerizable photoinitiators of the invention and to the use of the copolymers in UV-crosslinkable compositions, for example, as adhesives, particularly hot-melt adhesives.

UV-crosslinkable adhesives containing photoinitiators in the form of polymerized units, are disclosed, for example, in specifications DE-A 2,411,169 and EP-A 246,848.

Copolymerizable benzophenone or acetophenone derivatives are described, for example, in specifications EP-A 346,788 and EP-A 377,199.

Copolymerizable photoinitiators should be producible in a simple manner and be readily copolymerizable, and the copolymers containing photoinitiators should exhibit, in use, good application-technological properties, particularly high cohesion and adhesion when used as adhesives.

It is an object of the present invention to provide novel copolymerizable photoinitiators, and copolymers containing the photoinitiators of the invention in the form of polymerized units and exhibiting, when used as adhesives, improved cohesion and adhesion.

Accordingly, we have found the copolymerizable photoinitiators defined above, copolymers containing the same, and the use thereof in UV-crosslinkable compositions.

The compounds a) are, for example, (meth)acrylic compounds of the general formula (I)

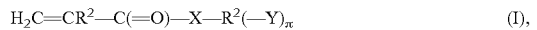

$$H_2C=CR^2-C(=O)-X-R^2(-Y)_\pi \quad (I),$$

in which the substituents and indices have the following meanings:

$R^1$ denotes —H, —$CH_3$,

X denotes —O—, —NH—, —$NR^3$— or —S—, preferably —O—, $R^3$ denotes linear or branched $C_1$-$C_6$ alkyl, $R^2$ denotes a $(\pi+1)$-binding, optionally substituted linear or branched $C_1$-$C_{12}$ alkyl group, preferably a $C_2$-$C_8$ alkyl group, or a $C_3$-$C_{12}$ cycloalkyl group, optionally substituted, preferably a $C_5$ and $C_6$ cycloalkyl group, or a $C_6$-$C_{10}$ aryl group, optionally substituted, preferably a phenyl group, Y denotes —OH, —$NH_2$, —$NHR^3$ or —SH, preferably —OH, $\pi$ is a number from 1 to 5, preferably 1.

In formula (I) the structural element —$R^2(-Y)_\pi$ can alternatively be a group of the general formula (II), (III) or (IV)

$$-(EO)_k-(PO)_l-H \quad (II),$$

$$-(PO)_l-(EO)_k-H \quad (III),$$

$$-(EO_k/PO_l)-H(IV), \text{ in which}$$

EO stands for a —$CH_2$—$CH_2$—O group,

PO stands for a —$CH_2$—$CH(CH_3)$—O or a —$CH(CH_3)$—$CH_2$—O group and k and l for numerical values from 0 to 15, frequently from 0 to 10 and often from 0 to 5, but k and l are not both 0. Frequently either k or l is equal to 1, 2, 3, or 4 and often to 1.

Furthermore, in formulas (II) and (III)

$(EO)_k$ should denote a block of k —$CH_2$—$CH_2$—O groups, and $(PO)_l$ a block of l-$CH_2$—$CH(CH_3)$—O or —$CH(CH_3)$—$CH_2$—O groups, and in formula (IV) $(EO_k/PO_l)$ should denote a mixture of k —$CH_2$—$CH_2$—O groups and l-$CH_2$—$CH(CH_3)$—O or —$CH(CH_3)$—$CH_2$—O groups in random distribution.

A significant fact is that in formulas (II), (III), or (IV) either EO or PO can be replaced by BO, where BO stands for a —$CH_2$—$CH(C_2H_5)$—O or a —$CH(C_2H_5)$—$CH_2$—O group as well as a —$CH_2$—$C(CH_3)_2$—O or a —$C(CH_3)_2$—$CH_2$—O group.

By linear or branched $C_1$-$C_6$ alkyl is meant linear or branched alkyl containing from 1 to 6 carbons, for example, methyl, ethyl, n-propyl, isopropyl, n-butyl, sec-butyl, isobutyl, tert-butyl, n-pentyl, isopentyl, tert-pentyl, n-hexyl, isohexyl, or tert-hexyl.

By a $(\pi+1)$-binding, linear or branched $C_1$-$C_{12}$ alkyl group we mean alkyl derived from, for example, methyl, ethyl, propyl, 2-methyl-propyl, 2,2-dimethylpropyl, and n-butyl and isomers thereof, n-pentyl and isomers thereof, n-hexyl and isomers thereof, n-heptyl and isomers thereof, n-octyl and isomers thereof, n-nonyl and isomers thereof, n-decyl and isomers thereof, n-undecyl and isomers thereof, or n-dodecyl and isomers thereof. Of course, the aforementioned alkyl groups may be substituted by further mono-, di-, or tri-functional groups, such as halogens, ie fluorine, chlorine, or bromine, or alkoxyl groups, such as methoxy, ethoxy, or butoxy groups, in which case the covalence of the alkyl groups rises by the number of such substituents.

By $(\pi+1)$-binding $C_3$-$C_{12}$ cycloalkyl groups we mean (n+1)-binding cycloalkyl groups derived, for example, from cyclopropyl, cyclobutyl, cyclopentyl, cyclohexyl, cycloheptyl, cyclooctyl, cyclononyl, or cyclodecyl. Furthermore they may be taken to mean bicyclic compounds derived from bicyclohexane, bicycloheptane, bicyclooctane, bicyclononane, bicyclodecane, and bicycloundecane or bicyclododecane. Of course, the aforementioned cycloalkyl groups may be substituted by further mono-, di-, or tri-functional groups, such as $C_1$-$C_6$ alkyl groups, halogens, or alkoxyl groups, in which case the covalence of the cycloalkyl rises by the number of such substituents. Frequently 1,2-cyclopropylene, [1,2 or 1,3]-cyclobutylene, [1, 2 or 1,3]-cyclopentylene, [1,2, 1,3, or 1,4]-cyclohexylene, [1,2, 1,3, or 1,4]-cycloheptylene, bicyclooctylene, bicyclononylene, bicyclodecylene and bicycloundecylene groups are used.

By $(\pi+1)$-binding $C_6$-$C_{10}$ aryl groups we mean $(\pi+1)$-binding aryl groups derived from phenyl or naphthyl groups. Of course, the aforementioned aryl groups may be substituted by 1, 2, or 3 substituents, such as $C_1$-$C_6$ alkyl groups, halogens, or alkoxyl groups, in which case the covalence of the aryl groups rises by the number of these substituents. Frequently, use is made, in particular, of [1,3 and 1,4]-phenylene or [1,3,1,4,1,5, and 2,6]-naphthylene groups.

An essential feature is that the aforementioned groups $R^2$ are substituted by $\pi$ Y groups. $\pi$ denotes here a number from 1 to 5, for example, 1, 2, 3, 4 or 5, but particularly 1.

Compounds a) used are, in particular: 2-hydroxyethyl (meth)acrylate, 2-hydroxy-2-methylethyl(meth)acrylate, 3-hydroxypropyl (meth)acrylate, 2-hydroxy-2-ethylethyl

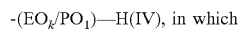

(meth)acrylate, 4-hydroxybutyl (meth)acrylate, further neopentyl glycol mono(meth)acrylate, glycerol mono(meth)acrylate, trimethylolpropane mono(meth)acrylate, pentaerythritol mono(meth)acrylate, N-hydroxy-ymethyl (meth)acrylamide, and N-hydroxyethyl(meth)acrylamide, 5-hydroxy-3-oxopentyl(meth)acrylamide, N-hydroxymethylcrotonamide or N-hydroxyethylmaleinimide. Particular preference is given to 2-hydroxyethyl(meth)acrylate, 3-hydroxypropyl acrylate, and 4-hydroxybutyl(meth)acrylate.

Compounds b) containing at least 2 isocyanate groups usually exhibit the structure of the general formula (V)

$$Q(-NCO)_\lambda \qquad (V).$$

In formula (V), Q should denote, for example,

- a linear or branched $C_3$-$C_{16}$ alkane compound, for example, propane, 2-methylpropane, 2,2-dimethylpropane, n-butane and isomers thereof, n-pentane and isomers thereof, n-hexane and isomers thereof, n-heptane and isomers thereof, n-octane and isomers thereof, n-nonane and isomers thereof, n-decane and isomers thereof, n-undecane and isomers thereof, and n-dodecane and isomers thereof, n-tridecane and isomers thereof, n-tetradecane and isomers thereof, n-pentadecane and isomers thereof and also n-hexadecane and isomers thereof, preferably a $C_6$-$C_{13}$ alkane compound, optionally substituted by 1, 2 or 3 halogens, oxo, ester, or alkoxy groups, or
- a $C_6$-$C_{14}$ aromatic compound, for example, benzene, diphenylmethane, naphthalene, phenanthrene, preferably benzene and diphenylmethane, optionally substituted by 1, 2, or 3 halogens, $C_1$-$C_6$ alkyl, oxo, ester, or alkoxy groups, or
- a $C_3$-$C_{16}$ cycloalkane compound, for example, cyclopropane, cyclobutane, cyclopentane, cyclohexane, cycloheptane, cyclooctane, bicyclooctane, bicyclononane, bicyclodecane, bicycloundecane, bicyclododecane, and bis(cyclohexyl)methane, preferably cyclopentane, cyclohexane, bis(cyclohexyl)methane, optionally substituted by 1, 2, or 3 halogens, $C_1$-$C_6$ alkyl, oxo, ester, or alkoxy groups, or
- an arylalkyl compound containing from 6 to 10 carbons in the aryl moiety and from 1 to 6, preferably from 1 to 4 carbon atoms in the alkyl moiety, optionally further substituted by 1, 2, or 3 halogens, oxo, ester, or alkoxy groups, which is substituted by λ isocyanate groups (—NCO), λ, which denotes the average functionality, being a number ≧2, often a number from 2 to 6, and frequently a number from 2 to 4. In particular, λ is equal to 2.

Examples of compounds of the general structure (V) are aliphatic, cycloaliphatic, and aromatic isocyanates known from the prior art. Preferred di- or poly-isocyanates are 4,4'-diphenylmethane diisocyanate, the mixtures of monomeric diphenylmethane diisocyanates and oligomeric diphenylmethane diisocyanates (polymeric MDI), tetramethylene diisocyanate, tetramethylene diisocyanate trimers, hexamethylene diisocyanate, hexamethylene diisocyanate trimers, isophorone diisocyanate trimer, 4,4'-methylenebis(cyclohexyl) diisocyanate, xylylene diisocyanate, tetramethylxylylene diisocyanate, [1,3 and 1,4]-bis(isocyanatomethyl)cyclohexanes, dodecyl diisocyanate, lysine alkylester diisocyanate, alkyl standing for $C_1$ to $C_{10}$, [2,2, 4 or 2,4,4]-trimethyl-1,6-hexamethyllene diisocyanate, 1,4-diisocyanatocyclohexane or 4-isocyanatomethyl-1,8-octamethylene diisocyanate.

Special preference is given to di- or poly-isocyanates containing isocyanate groups of different reactivity, such as 2,4-toluoylene diisocyanate (2,4-TDI), 2,4'-diphenylmethane diisocyanate (2,4'-MDI), triisocyanatotoluene, isophorone diisocyanate (IPDI), 2-butyl-2-ethylpentamethylene diisocyanate, and 2-isocyanatopro-pylcyclohexyl isocyanate, 3(4)isocyanatomethyl-1-methylcyclohexyl isocyanate, 1,4-diisocyanato-4-methylpentane, 2,4'-methylenebis(cyclohexyl) diisocyanate and 4-methylcyclohexane 1,3-diisocyanate (H-TDI).

Furthermore, those isocyanates are particularly preferred whose isocyanate groups are originally equally reactive, but in which initial addition of an alcohol, thiol, or amine to one of the isocyanate groups can induce a reduction of the reactivity of the second isocyanate group. Examples thereof are isocyanates whose isocyanate groups are coupled through a delocalized electron system, eg, [1,3 and 1,4]-phenylene diisocyanate, 1,5-naphthylene diisocyanate, diphenyl diisocyanate, tolidine diisocyanate, or 2,6-toluoylene diisocyanate.

Another significant fact is that suitable compounds of the general formula (V) are also those di- and poly-isocyanate compounds which can be produced from said di- or poly-isocyanates or mixtures thereof by linking through urethane, allophanate, urea, biuret, uretdione, amide, isocyanurate, carbodiimide, uretoneimine, oxadiazinetrione, or iminooxadiazinedione structures.

Compounds c) used in the present invention exhibit, for example, a structure conforming to general formula (VI)

$$A-C(=O)-B-D \qquad (VI),$$

in which

A denotes $C_1$-$C_3$ alkyl, such as methyl, ethyl, n-propyl, or isopropyl, $C_6$-$C_{10}$ aryl, optionally substituted by 1, 2 or 3 halogens, $C_1$-$C_6$ alkyl, esters or alkoxy groups, for example, phenyl or naphthyl, and aralkyl containing from 6 to 10 carbons in the aryl moiety and from 1 to 6 carbon atoms in the alkyl moiety, for example, benzyl, B denotes $C_6$-$C_{10}$ arylene, such as 1,2-, 1,3- and 1,4-phenylene, 1,2-, 1,3-, 1,4-, 1,5- and 2,6-naphthylene, optionally substituted by 1, 2, or 3 halogens, $C_1$-$C_6$ alkyls, esters, or alkoxy groups and D denotes —$NH_2$, —$NHR^3$, OH, SH, or a structural element —X—$R^2$(—Y)$_{\pi}$, the variants having the meanings stated above for formula (I).

The acetophenone or benzophenone derivatives conforming to the general formula (VI) can, for example, be [2, 3, or 4]-hydroxyacetophenone, [2, 3 or 4]-hydroxypropiophenone, [2, 3, or 4]-(2-hydroxyethoxy)acetophenone, [2, 3, or 4]-aminoacetophenone, [2-, 3 or 4]-aminopropiophenone, and [2, 3, or 4]-hydroxybenzophenone, 2-hydroxy-5-methylbenzophenone, 5-chloro-2-hydroxybenzophenone, 2-hydroxy-4-methylbenzophenone, [2, 3, or 4]-(2-hydroxyyethoxy)benzophenone, 4-hydroxy-4'-methoxybenzophenone, and [2, 3, or 4]-aminobenzophenone, [2, 3, or 4]-anilinobenzophenone, 2-amino-4-methylbenzophenone, 2-amino-4'-methylbenzophenone, 2-amino-4'-chlorobenzophenone, or 2-amino-5-chlorobenzophenone.

In particular, preference is given to [2 or 4]-hydroxyacetophenone, [2 or 4]-hydroxypropiophenone, [2 or 4]-(2-hydroxyethoxy)acetophenone, [2 or 4]-aminoacetophenone, [2 or 4]-aminopropiophenone, and [2 or 4]-hydroxybenzophenone, [2 or 4]-(2-hydroxyethoxy)benzophenone, and [2 or 4]-aminobenzophenone used.

The copolymerizable photoinitiators are usually produced by placing at least one compound b), frequently together with an organic solvent, in a reaction vessel under an atmosphere of inert gas, preferably nitrogen, where it is heated to the reaction temperature with stirring. There is then added, continuously or batchwise, at least one compound a) at the reaction temperature. The amount of compound a) is governed by the number n of isocyanate-reactive groups and is usually such that the ratio of the number of mols of compound b) to the product of the number of moles of compound a) and the number $\pi$ is from 0.8 to 1 to 1 to 0.8 or from 0.9 to 1 to 1 to 0.9 or from 0.95 to 1 to 1 to 0.95. If compound a) has, for example, only one isocyanate-reactive group Y ($\pi$=1), there are used, per mol of compound b), $\geq$20.8 mol, $\geq$0.9 mol, or $\geq$0.95 mol and $\leq$1.05 mol, $\leq$1.11 mol, or $\leq$1.25 mol of compound a). If however, compound a) possesses, for example, two isocyanate-reactive groups Y($\pi$=2), there will be used, per mol of compound b), 20.4 mol, $\geq$0.45 mol, or $\geq$0.48 mol and $\leq$0.53 mol, $\leq$0.56 mol, or $\leq$0.63 mol of compound a).

The reaction time is usually such that compound a) reacts quantitatively with compound b). Usually therefore the content of isocyanate groups in the reaction mixture is monitored during the reaction of compound a) with compound b), which content remains constant when compound a) has reacted. Determination of the content of isocyanate groups is familiar to the person skilled in the art and is usually carried out by addiing an excess of amine, based on the isocyanate groups, and back titrating the amino groups not consumed with dilute hydrochloric acid as specified in DIN 53,185.

The aforementioned reaction is particularly successful when carried out in the presence of a catalyst, which is used in a concentration of from 0.0001 to 1 wt % and preferably from 0.001 to 0.1 wt %, based on the weight of isocyanate compound b). Suitable catalysts are organometallic compounds, specifically organotin, organozinc, organobismuth, or organozirconium compounds. Particularly preferred is dibutyltin dilaurate. Strong bases, preferably nitrogen-containing compounds, such as tributylamine, quinnuclidine, diazabicyclooctane, diazabicyclononane, or diazabicycloundecane may also be used.

Suitable solvents are anhydrous organic solvents, such as acetone, 2-butanone, ethyl acetate, butyl acetate, tetrahydrofuran, dioxan, benzene, toluene, xylene, ethylbenzene, chlorobenzene, dichlorobenzene, dimethylformamide, dimethyl acetamide, or N-methylpyrrolidone. In particular, acetone, 2-butanone, tetrahydrofuran, ethyl acetate, or chlorobenzene are used.

The reaction temperature is usually from 0° to 120° C., preferably from 20° to 100° C., and more preferably from 25° to 90° C. The reaction may be carried out under ambient pressure or under superatmospheric pressure, for example, under a pressure of $\geq$0.1 bar, $\geq$20.5 bar, $\geq$22 bar, or $\geq$5 bar. Of course, the reaction may be carried out under subatmospheric pressure, depending on the boiling point of the solvent, if used.

In a subsequent second reaction stage, the reaction mixture emerging from the aforementioned reaction of compounds a) and b) is admixed with compound c) continuously or batchwise at the reaction temperature. The amount of compound c) used is governed by its number of isocyanate-reactive groups and the number of isocyanate groups still free in compound b). It is usually such that the isocyanate groups in compound b) are converted quantitatively and can no longer be detected titrimetrically as specified in DIN 53,185. This is usually the case when the isocyanate content of the reaction mixture is $\leq$0.1 wt % of isocyanate groups, which corresponds to the detection limit of titration.

Another possibility, of course, is to cause compound b) to react first of all with compound c) and then with compound a) or to cause compound b) to react concurrently with compound a) and compound c). However, it is important that the reactions are controlled such that after the addition of compounds a) and c) to the reaction mixture no more isocyanate can be detected. Preferably however, compound b) is caused to react first with compound a) and then with compound c).

The resulting reaction mixtures contain, as products, copolymerizable photoinitiators of the general formula (VII)

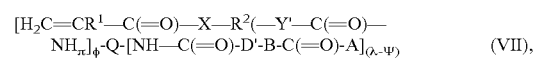

$$[H_2C=CR^1-C(=O)-X-R^2(-Y'-C(=O)-NH_\pi]_\phi\text{-Q-[NH-C(=O)-D'-B-C(=O)-A]}_{(\lambda-\Psi)} \quad (VII),$$

in which $R^1$, X, and $R^2$, $\pi$, Q, $\lambda$, B and A have the meanings given for formulas (I), (V) and (VI) and $\phi$ stands for a number $\Psi \geq 0.8$, $\geq 0.9$ or $\geq 0.95$ and $\leq 1.05$, $\leq 1.11$ or $\leq 1.25$ in each case divided by the value of $\pi$, Y' stands for a group Y in the deprotonated form (—O—, —NH—, —NR³—, —S—) and D' stands for a group D in the deprotonated form [—O—, —NH—, —NR³—, —S— and —XR²(—Y')$_\pi$].

In particular, each of $\pi$, $\Psi$ and $\phi$ denotes a numerical value of 1.

Preferably the copolymerizable photoinitiators used are compounds conforming to formula (VII), in which $R^1$ denotes —H, X and Y' denote —O—, $R^2$ denotes ethylene, Q denotes 2,4-toluenyl, D' denotes —O—CH$_2$CH$_2$—O—, B denotes 1,4-phenylene and A denotes phenyl, $\pi$ and $\Psi$ denote 1 and $\lambda$ denotes 2, or $R^1$ denotes —H, X and Y' denote —O—, $R^2$ denotes ethylene, Q denotes 3-methylene-3,5,5-trimethyl-1-cyclohexyl, D' denotes —O—CH$_2$CH$_2$—O—, B denotes 1,4-phenylene and A denotes phenyl, $\pi$ and $\Psi$ denote 1 and $\lambda$ denotes 2, or $R^1$ denotes —H, X and Y' denote —O—, $R^2$ denotes ethylene, Q denotes 1,6-hexamethylene, D' denotes —O—CH$_2$CH$_2$—O—, B denotes 1,4-phenylene and A denotes phenyl, $\pi$ and $\Psi$ denote 1 and $\lambda$ denotes 2.

Usually the copolymerizable photoinitiators of the invention are used for copolymerization in the reaction mixture without further purification or removal of solvent.

The copolymers of the invention are obtained by polymerization of a mixture of ethylenically unsaturated monomers, in which the photoinitiators of the invention are usually present in a total amount of from 0.01 to 10 wt %, preferably from 0.05 to 5 wt % and more preferably from 0.1 to 2 wt %, based, in each case, on the total amount of monomers. Correspondingly, the photoinitiators of the invention are incorporated as polymerized units in the copolymers in concentrations of from 0.01 to 10 wt %, preferably from 0.05 to 5 wt %, and more preferably from 0.1 to 2 wt %. It should be noted here that the said percentage contents of the polymerized units of ethylenically unsaturated copolymerizable photoinitiators incorporated in the copolymer plus the contents of the other monomers should generally correspond to the concentrations of these components in the monomer mixture to be polymerized and vice versa.

The copolymers contain, besides the aforementioned photoinitiators, polymerized units of the main monomers generally in major amounts, comprising in most cases from 50 to 99,99 wt % and preferably from 70 to 97,5 wt % of esters of preferably $C_{3-6}$ $\alpha,\beta$-mono-ethylenically unsaturated mono- and di-carboxylic acids, such as, in particular, acrylic acid, methacrylic acid, maleic acid, fumaric acid, and itaconic acid, with generally $C_{1-12}$, preferably $C_{1-8}$ and more preferably $C_{1-4}$ alkanols, such as, in particular, methyl, ethyl, n-butyl, isobutyl, and 2-ethylhexyl(meth)acrylates, dimethyl maleate or di-n-butyl maleate. Suitable comonomers are, in particular, monomers that are capable of undergoing simple free-radical polymerization, such as ethylene, vinylaromatic monomers, such as styrene, α-methylstyrene, o-chlorostyrene or vinyl toluenes, esters of vinyl alcohol and $C_{1-18}$ monocarboxylic acids, such as vinyl acetate, vinyl propionate, vinyl-n-butyrate, vinyl laurate and vinyl stearate, nitriles of α,β-monoethylenically unsaturated carboxylic acids, such as acrylonitrile, and $C_4$-$C_8$ conjugated dienes, such as 1,3-butadiene and isoprene.

It is particularly advantageous when the copolymers contain, in addition to the aforementioned monomers, from 0.1 to 15 wt %, and preferably from 0.5 to 8 wt % of $C_{3-6}$ α,β-monoethylenically unsaturated mono- and di-carboxylic acids, amides thereof, and/or anhydrides thereof, such as, in particular, acrylic acid, methacrylic acid, maleic acid, fumaric acid, itaconic acid, acrylamide, methacrylamide, maleic anhydride, also vinylsulfonic acid, 2-acrylamido-2-methylpropanesulfonic acid, styrenesulfonic acid and their water-soluble salts, and N-vinylpyrrolidone.

The copolymers can contain, in addition to the above monomers, further comonomers incorporated as polymerized units, for example, those which usually increase the structural strength of films produced from the copolymers. These ethylenically unsaturated monomers normally exhibit at least one epoxy, hydroxyl, N-methylol or carbonyl group, or at least two non-conjugated ethylenically unsaturated double bonds. Examples thereof are N-alkylolamides of α,β-monoethylenically unsaturated carboxylic acids having from 3 to 10 carbon atoms, of which N-methylol acrylamide and N-methylol methacrylamide are very much preferred, and also their esters with alkanols containing from 1 to 4 carbons. Also suitabe are monomers having two alkenyl radicals, monomers having two vinylidene groups and monomers having two vinyl groups. Particularly advantageous here are the diesters of dihydroxylic alcohols with α,β-monoethylenically unsaturated monocarboxylic acids, of which acrylic acid and methacrylic acid are particularly preferred. Examples of such monomers containing two non-conjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylates, and divinyl benzene, vinyl methacrylate, vinyl acrylate, allyl methacrylate, allyl acrylate, diallyl maleate, diallyl fumarate, methylene bisacrylamide, cyclopentadienyl acrylate, triallyl cyanurate, or triallylisocyanurate. Particularly significant in this context are in addition $C_1$-$C_8$-hydroxyalkyl (meth)acrylates such as n-hydroxyethyl, n-hydroxypropyl or n-hydroxybutyl (meth)acrylates, and compounds such as diacetoneacrylamide and acetylacetoxyethyl(meth)acrylate. In the present invention, the aforementioned monomers are frequently incorporated as polymerized units in amounts of from 0.1 to 10 wt %, based on the total weight of the monomers to be polymerized.

The manner in which the monomeric components are to be added to the polymerization vessel during the free-radical polymerization, is known to the person possessing average skill in the art. These can be placed in the polymerization vessel as a single initial batch, or they can be added continuously or batchwise at the rate at which they are consumed during the free-radical polymerization. Specifically, this depends on the chemical nature of the initiator system and on the polymerization temperature. Preferably a small portion of the monomeric components is used as initial batch and the rest is fed to the polymerization zone at the rate at which it is consumed. Another possibility, of course, is to modify the composition of the monomer mixture to be polymerized, during polymerization. These process variants are known to the person skilled in the art. For example, in the so-called step method first of all a monomer mixture 1 and then a monomer mixture 2 having a different monomeric composition will be fed to the polymerization vessel at the rate at which the monomers are consumed, whilst in the so-called gradient method the composition of the monomer mixture that is fed to the polymerization vessel will be continuously changed. Frequently the polymerization is carried out under an atmosphere of inert gas, for example, under a blanket of nitrogen or argon.

The copolymers of the invention usually have K values of from 10 to 150 and often of from 15 to 100. Determination of the K value is carried out, usually at 25° C. according to DIN ISO 1628-1, on a 1 wt % strength solution of the copolymer in tetrahydrofuran. Preferably the K value is from 25 to 55 when the copolymer is to be used as a hot-melt adhesive. When the copolymer is to be used in a UV-curable composition for coating mineral surfaces, its K value is preferably from 60 to 100. Copolymers designed for use in coating compositions preferably have K values of from 15 to 85.

The copolymers of the invention can exhibit glass transition temperatures of from −70 to +150° C. Depending on the end use, copolymers are frequently required whose glass transition temperatures are within certain limits. By suitably selecting the ethylenically unsaturated monomers to be polymerized, the person skilled in the art can produce copolymers whose glass transition temperatures are definitely in the desired range. If, for example, the copolymers of the invention are to be used as contact-bonding adhesives, the composition of the monomer mixture to be polymerized is such that the copolymers produced have glass transition temperatures of <0° C., frequently ≦+5° C., and often ≦+10° C. If, however, the copolymers are to be used as UV-curable binding agents in coating compositions, the composition of the monomer mixture to be polymerized is such that the copolymers produced show glass transition temperatures of from −40° to +150° C., frequently from 0° to +100° C., and often from +20° to +80° C.

By the glass transition temperature $T_g$, we mean the limiting value of the glass transition temperature which it approaches with increasing molecular weight as described by G. Kanig (Kolloidzeitschrift & Zeitschrift fr Polymere, Vol. 190, page 1, equation 1). The glass transition temperature is determined by the DSC method (Differential Scanning Calorimetry, 20 K/min, mid-point reading, DIN 53,765).

According to Fox (T.G. Fox, Bull. Am. Phys. Soc. 1956 [Ser. II] 1, page 123 and according to Ullmanns Encyclopaedie der technischen Chemie, Vol. 19, page 18, 4th Edition, Verlag Chemie, Weinheim, 1980) the following applies to the glass transition temperature of not more than weakly crosslinked copolymers, as a good approximation:

$$1/T_g = x^1/T_g^1 + x^2/T_g^2 + \ldots x_n/T_g^n,$$

in which $x^1, x^2 \ldots x_n$ denote the mass fractions of the monomers 1, 2 ... n and $T_g^1, T_g^2 \ldots T_g^n$ denote the glass transition temperatures of the polymers composed of, in each case, only one of the monomers 1, 2 ... n, in degrees Kelvin. The $T_g$ values for the homopolymers of most monomers are known and are listed, for example, in Ullmann's Encyclopedia of Industrial Chemistry, Vol. 5, Vol. A21, page 169, VCH Weinheim, 1992; further sources of glass transition temperatures of homopolymers are, eg, J. Brandrup, E.H. Immergut, Polymer Handbook, $1^{st}$ Ed., J. Wiley, New York 1966, $2^{nd}$ Ed. J. Wiley, New York 1975, and 3rd Ed. J. Wiley, New York 1989).

The novel copolymers can be produced by copolymerization of the monomeric components using conventional polymerization initiators and, optionally, modifiers, polymerization being carried out at the usual temperatures in substance, in emulsion, for example, in water or suitable organic media, or in solution. Preferably, the novel copolymers are produced by polymerization of the monomeric components in organic solvents, particularly in solvents having a boiling range of from 50° to 150° C., preferably from 60° to 120° C., using conventional amounts of polymerization initiators, which are generally from 0.01 to 10 wt %, and particularly from 0.1 to 4 wt %, based, in each case, on the total weight of the monomeric components. Suitable organic solvents are, in particular, alcohols, such as methanol, ethanol, n-propanol, isopropanol, n-butanol and isobutanol, cyclic ethers, such as tetrahydrofuran, and hydrocarbons, such as toluene and gasolenes boiling at temperatures ranging from 60° to 120° C. Furthermore ketones, such as acetone, methyl ethyl ketone and esters, such as ethyl acetate, and mixtures of solvents of said types can be used, in which case mixtures containing isobutanol and/or methyl ethyl ketone in amounts of $\geq 70$ wt %, particularly $\geq 80$ wt %, and more particularly $\geq 90$ wt %, based on the solvent mixture used are preferred.

The manner in which the solvent or solvent mixture is added to the polymerization vessel during the free-radical polymerization, is known to the person possessing average skill in the art. It can be placed as a single initial batch in the polymerization vessel, or it can be used continuously or stepwise during the free-radical polymerization. In addition, the solvent can be used in admixture with the monomers and/or the initiator. Preferably, a major portion of the solvent is used as initial batch and the rest is fed to the polymerization zone together with the monomers to be polymerized and/or initiators.

Suitable polymerization initiators for solvent polymerization are, for example, azo compounds, such as 2,2'-azobisisobutyronitrile, 2,2'-azobis-2-methylbutyronitrile, diacyl peroxides, such as dibenzoyl peroxide, dilauroyl peroxide, didecanoyl peroxide, and diisononanoyl peroxide, alkyl peresters, such as tert-butyl perpivalate, tert-butyl per-2-ethylhexanoate, tert-butyl permaleate, tert-butyl perisononanoate, and tert-butyl perbenzoate, dialkylperoxides, such as dicumyl peroxide or di-tert-butyl peroxide, peroxydicarbonates, such as dimyristyl peroxydicarbonate, dicetyl peroxydicarbonate, bis(4-tert-butylcyclohexyl) peroxydicarbonate, dicyclohexyl peroxydicarbonate, bis(2-ethylhexyl) peroxydicarbonate, and hydroperoxides, such as tert-butyl hydroperoxide, and cumene hydroperoxide, alone or intermixed. In aqueous emulsion polymerization, conventional initiators, such as sodium, potassium, and ammonium peroxodisulfates or alternatively redox systems known to the person skilled in the art can be used.

The manner in which the initiator is added to the polymerization vessel during the free-radical polymerization, is known to the person possessing average skill in the art. It may be placed in the polymerization vessel as a single initial batch, or it may be used continuously or stepwise at the rate at which it is consumed during the free-radical polymerization. Specifically, this depends on the chemical nature of the initiator system and on the polymerization temperature. Preferably, a small portion is used as initial batch and the rest is fed to the polymerization zone at the rate at which it is consumed. It is frequently advantageously when the polymerization reaction is controlled such that first of all $\leq 50$ wt %, often $\leq 45$ wt %, or $\leq 40$ wt % of the initiator is fed to the polymerization vessel continuously over a relatively long period of time and then $>50$ wt %, often $\geq 55$ wt %, or $\geq 60$ wt % of the initiator is fed in continuously over a shorter period of time.

Polymerization can be carried out in conventional manner in polymerization apparatus, generally equipped with an agitator, several feed boxes or feed pipes, a reflux condenser and heating and cooling means and designed for operation under an atmosphere of inert gas under pressures above or below atmospheric pressure.

Following polymerization in solution, the solvents can be separated, optionally under reduced pressure, this being done at an elevated temperature of up to 150° C. The novel copolymers can then be used in a low-solvent or solventless state, ie as a melt, as adhesives, preferably self-adhesives and, in particular, hot-melt adhesives, or as UV-curable binding agents in coating compositions, such as protective materials for coating mineral surfaces or as paints. It may in many cases be advantageous to prepare the novel copolymers by copolymerization in substance, ie without the assistance of a solvent, in which case production may take place batchwise or continuously, for example, as described in U.S. Pat. No. 4,042,768.

If the novel copolymers are used in the form of solutions, for example, as UV-curable binding agents in coating compositions, such as protective materials for coating mineral surfaces or as paints, the copolymer solutions usually contain from 1 to 900 parts by weight, preferably from 10 to 100 parts by weight, and more preferably from 20 to 40 parts by weight of solvent per 100 parts by weight of copolymer. Frequently, the copolymer solutions obtained by solvent polymerization can be used unchanged for these purposes, or they can be produced therefrom by simple dilution or concentration.

In some cases, for example, when the novel copolymers are produced by aqueous free-radical emulsion polymerization, it is possible to include conventional regulators in conventional amounts, for example, in concentrations of from 0.1 to 10 parts by weight or from 0.5 to 5 parts by weight per 100 parts by weight of the monomers to be polymerized. Such regulators are used for the regulation of the molecular weight of the copolymers and are known to the person skilled in the art. Frequently, use is made of mercapto compounds, such as 2-mercaptoethanol, methyl 3-mercaptopropionate, 3-mercaptopropyltrimethoxysilane, 3-mercaptopropylmethyldimethoxysilane, 3-mercaptopropionic acid, n- or tert-dodecyl mercaptan, 1,6-dimercaptohexane, 1,9-dimercaptononane, hydrocarbons, such as cumene, alcohols, such as isopropanol and isobutanol or halogenated hydrocarbons, such as carbon tetrachloride, carbon tetrabromide, chloroform, or bromoform, ethers, such as tetrahydrofuran and dioxan, as regulators.

If the novel copolymers are produced by aqueous free-radical emulsion polymerization, polymerization is usually carried out in the presence of dispersing agents. The dispersing agents used can be protective colloids and/or emulsifiers as are familiar to the person skilled in the art, for example, non-ionic and anionic or cationic emulsifiers. Preferably, non-ionic and anionic emulsifiers are used. The concentration of dispersant is usually up to 30 parts by weight, preferably from 0.5 to 10 parts by weight, and more preferably from 1 to 6 parts by weight, based on 100 parts by weight of the monomers to be polymerized.

Frequently, unconverted monomers are removed from the reaction mixture on completion of copolymerization. In the case of solvent polymerization, this is carried out at the same time as the removal of solvent under reduced pressure. In order to increase the efficiency, particularly on an industrial scale, the copolymer is stripped with steam when the solvent has been removed. This steam stripping is likewise frequently carried out on completion of free-radical emulsion polymerization, optionally after an interposed post-polymerization step, such as is known to the person skilled in the art, for example, from specifications WO 95/33775, EP-A 767, 180, or DE-A 19743759. It is significant that the photo-initiators of the invention, in copolymerized or non-copolymerized form, show better resistance to hydrolysis by water or other protic organic solvents, such as isopropanol or isobutanol, than the copolymerizable photoinitiators of the prior art.

When use is made of the novel copolymers, they can be modified in conventional manner and/or subjected to ancillary processing and, for example, used as hot-melt adhesives. Thus there can be added, for example, conventional tackifying resins, for example, hydrocarbon resins, modified natural colophoniums or chemically modified colophoniums, predominantly consisting of abietic acid or abietic acid derivatives, coumaron-indene resins, terpenephenolic resins, aldehyde resins, or homopolymers, such as poly-2-ethyl-hexyl acrylate or poly-α-methylstyrene, further plasticizers, for example, those based on mono-, di- or poly-ester compounds, perchlorinated hydrocarbons or paraffin oils, dyes, and pigments or stabilizing agents or rubber-elastic materials, such as natural or synthetic rubbers, polyvinyl ethers, and also polybutadiene oils, in amounts of from 0.1 to 50 wt %, based on the total weight.

Also suitable for modification are mono- or poly-olefinically unsaturated polymolecular compounds, such as polyesterols and polyetherols esterified with acrylic acid, such as the acrylates of tripropylene glycol, tetraethylene glycol, or other polyethylene glycols. Likewise suitable are diacrylates and dimethacrylates of polytetrahydrofuran having molecular weights of, in most cases, from 250 to 2000 (number average). Such diolefinically or polyolefinically unsaturated compounds may be advantageously used in concentrations of from 0.1 to 10 parts by weight per 100 parts by weight of copolymer, and diolefinically unsaturated compounds of this kind having a molecular weight of at least 500 (number average) are of particular interest.

The novel copolymers are particularly suitable for use as melts or solutions or in the form of aqueous dispersions for the production of coatings, protective films and impregnations, and particularly pressure-sensitive adhesives, self-adhesive films, self-adhesive labels, and embossed films. The compositions can be applied in conventional manner by brush coating, spraying, rolling, knife coating or pouring, optionally at elevated temperature—mostly in the temperature range of from 20° to 150® C.—on conventional substrates, for example, paper, paperboard, wood, metals, such as aluminum, plastics films, such as flexible PVC, polyethylene, polyamides, polyethylene glycol terephthalate, and polypropylene.

If solvents are used, they can be readily evaporated off from the coatings, optionally at room temperature or slightly elevated temperatures, generally at temperatures of from 20° to 150° C. and preferably from 50° to 80° C., for which purpose radiant heaters or hot-air rotary blowers are usually used. The possibly dried or predried coatings can then be UV-crosslinked by irradiation to give highly adhesive coatings exhibiting high cohesion combined with good adhesion and excellent resistance to ageing. Irradiation with UV light normally requires no inert gas conditions and can usually take place in air. The UV radiators used can be conventional radiators, for example, low-, medium-, and high-pressure mercury arc lamps having a power output of from 20 to 100 J/secxcm$^2$. Lamps of higher power output generally cause faster crosslinking. In some cases, the crosslinking irradiation may be accompanied, due to the infra-red emission of the lamps, by the removal of residual solvent or water.

The adhesive properties of flat substrates exhibiting a self-adhesive layer can be determined by measuring the shear strength as a measure of cohesion and the peel strength as a measure of surface tack.

EXAMPLES

I Production of Copolymerizable Photoinitiators

I a) Ethylene Glycol p-Benzophenone Ether

In a laboratory autoclave having a capacity of 2 L there were placed 520 g of diethylene glycol diethyl ether, 286 g of p-hydroxybenzophenone (>98 wt %), and 0.8 g of powdered potassium hydroxide. A pressure test was then carried out for 30 minutes using dry nitrogen. Following pressure let-down to atmospheric pressure and heating of the reaction mixture under a blanket of nitrogen to 120° C., 95.4 g of ethylene oxide were continuously forced in to give a maximum internal pressure of 4 bar over a period of 1 h. On completion of gassing with ethylene oxide, the reaction mixture was allowed to react, until the pressure remained constant for at least 30 minutes. The reaction mixture was discharged from the autoclave in the hot state, neutralized with 5 wt % strength aqueous hydrochloric acid, and poured into 2 L of ice water, and the reaction product was caused to crystallize by constant agitation. The resulting solid matter was filtered off in vacuo, washed with ice water and dried in vacuo (40° C., 10 mbar absolute). The resulting filtrate was concentrated in a rotary film evaporator to 20% of its volume, the precipitated product filtered off in vacuo, washed with ice water and likewise dried in vacuo. The total yield was 82% of theory.

I b) Copolymerizable Photoinitiators, General Production Instructions 1 mol of isocyanate as given in Table 1 was dissolved in anhydrous tetrahydrofuran (THF) at from 20° to 25° C. (ambient temperature) such that the urethane adduct produced in the first reaction step subsequently existed as a 35 wt % strength solution. After covering with dry nitrogen, 1 mol of hydroxyethyl acrylate, previously stabilized with 100 ppm of Tempol, was then added within a period of 5 minutes at room temperature. 500 ppm by weight (based on isocyanate used) of dibutyltin dilaurate were then added, and the mixture was stirred for approximately 5 hours at 50° C. while the fall in isocyanate content was monitored titrimetrically. Once the theoretical isocyanate content of the monourethane had been achieved, the molar amount of ethylene glycol p-benzophenone ether groups corresponding to the isocyanate still free is added as a 35 wt % strength solution from stage Ia) in THF having a temperature of 50° C. The reaction mixture was then further stirred at 50° C. until no more isocyanate groups could be detected titrimetrically. The resulting reaction mixtures were used directly in the following polymerization reaction.

TABLE 1

Isocyanates and solvents

| Photoinitiator | Isocyanate |
|---|---|
| A | 2,4-toluylene diisocyanate |
| B | isophorone diisocyanate |
| C | HDI-polyisocyanate |

| | |
|---|---|
| 2,4-Toluylene diisocyanate: | 95 wt %, Fluka AG |
| isophorone diisocyanate: | Vestanat ® IPDI, Degussa-Hls AG |
| HDI-polyisocyanate: | Basonat ® HI 100, BASF AG |
| dibutyltin dilaurate: | 95 wt %, Merck-Schuchardt |
| tetrahydrofuran: | 99.9 wt %, anhydrous |
| 2-hydroxyethyl acrylate: | ≧98.5 wt %, BASF AG |
| Tempol: | 2,2,6,6-tetramethyl piperidin-1-oxyl-4-ol, 98 wt %, Aldrich-Chemie |

I c) 4-(4-benzoylphenoxycarbonyloxy)-n-butyl acrylate (Comparative Photoinitiator)

The synthesis of 4-(4-benzoylphenoxycarbonyloxy)-n-butyl acrylate was carried out according to the teaching of EP-A 377,199. In the comparative example, a 35 wt % strength solution of the comparative photoinitiator in o-xylene was used.

II Production of the Copolymers

Example 1

In a reactor having a capacity of 2 L and provided with heating and cooling means and equipped with an anchor agitator, reflux condenser and evacuating and metering equipment there were placed, at room temperature under a blanket of nitrogen,
  108.5 g of isobutanol (IB; 99.5 wt %)
  50.5 g of feed stream 0.1 and
    4.3 g of feed stream 2
and the mixture was heated to 100° C. with stirring with the apparatus closed but without pressure compensation. Starting concurrently, the residual amount of feed stream 1 was metered in at this temperature over a period of 3 hours and the residual amount of feed stream 2 over a period of 3.5 hours. 15 minutes after completion of feed 2, feed 3 was commenced, this being metered in over a period of 15 minutes. At the same time as feed stream 3 was metered, the temperature was raised to 120° C.

On conclusion of feed 3, polymerization was continued for a further hour at 120° C. The temperature was then lowered to 100° C. and the pressure gently let down to atmospheric pressure, after which the solvent and the other low-boiling components were removed by distillation by careful application of vacuum to a final pressure of 10 mbar (absolute). The reaction batch was then cooled to room temperature.

Feed Stream 1
  491.0 g of n-butyl acrylate (n-BA; ≧99.5 wt %, BASF AG)
  278.5 g of 2-ethylhexyl acrylate (EHA; ≧99.6 wt %, BASF AG)
  189.0 g of methyl methacrylate (MMA; ≧99.9 wt %, BASF AG)
  23.0 g of acrylic acid (AA; ≧99.0 wt %, BASF AG)
  15.1 g of a 35 wt % strength solution of photoinitiator A in THF
Feed Stream 2
  41.7 g of IB
  0,3 g tert.-Butylper-2-ethylhexanoat (TBEH; ≧ 98.5 wt %, sold by Peroxid-Chemie GmbH)
Feed Stream 3
  16.7 g of IB
  2.0 g of TBEH There was obtained a clear, highly viscous polymer having a solids content of >99,9 wt %.

The solids content was generally determined by heating from 1 to 2 g of the resulting polymer at 140° C. to constant weight in an aluminum crucible having a diameter of ca 3 cm, under atmospheric pressure. In each case two readings were taken. The values given represent the averages of these readings. In all of the following examples solids contents of >99,9 wt % were likewise found.

The K value of the copolymer was 50.5.

The K values of the copolymers were generally determined as specified by H. Fikentscher, Cellulosechemie 1932 (13) pages 58 to 64 and pages 71 to 74, where K is equal to k×103. The readings were taken at 25° C. on a 1 wt % strength solution of the copolymers in THF (corresponding to DIN ISO 1628-1).

Comparative Example

The comparative example was carried out in a manner similar to that described in Example 1 with the exception that instead of the photoinitiator A the same amount of the comparative photoinitiator was used. The K value was found to be 50.5.

Example 2

Example 2 was carried out in a manner similar to that described in Example 1 exception that instead of IB use was made of methyl ethyl ketone (MEK; 2≧99.0 wt %, Deutsche Shell Chemie GmbH). A K value of 51.8 was found.

Example 3

Example 3 was a repetition of Example 1 except that instead of the photoinitiator A the identical amount of photoinitiator B was used. The K value was found to be 48.0.

Example 4

Example 4 was a repetition of Example 1 except that instead of the photoinitiator A the identical amount of photoinitiator C was used. The K value was found to be 48.6.

Example 5

Example 5 was a repetition of Example 1 except that 30.2 g of a 35 wt % strength solution of photoinitiator A in THF were used. The K value was found to be 52.0.

Example 6

Example 6 was a repetition of Example 1 except that in the feed streams 2 and 3 instead of TBEH 2,2'-azobis-2-methylbutyronitrile
(Wako V59, WAKO Chemicals GmbH) were used. The K value was found to be 49.6.

Example 7

In a reactor having a capacity of 2 L and provided with heating and cooling means and equipped with an anchor agitator, reflux condenser and evacuating and metering equipment
  110.5 g of IB
  52.5 g of feed stream 1 and
    4.0 g of feed stream 2 were used as initial batch at room temperature under a blanket of nitrogen and heated to 100° C. in closed apparatus without pressure compensation, with stirring. Starting concurrently, the residual amount of feed stream 1 was metered in at this temperature over a period of 3 hours and the residual amount of feed stream 2 over a period of 3.5 hours. 15 minutes after completion of feed 2, feed 3 was commenced, this being metered in over a period of 15 minutes. At the same time as feed stream 3 was metered, the temperature was raised to 120° C.

On conclusion of feed 3, polymerization was continued for a further hour at 120° C. The temperature was then lowered to 100° C. and the pressure carefully let down to atmospheric pressure, after which the solvent and other low-boiling components were removed by distillation by gentle application of vacuum to a final pressure of 10 mbar (absolute). The batch was then cooled to room temperature. There was obtained a clear, highly viscous polymer having a solids content of >99,9 wt %. The K value was found to be 50.5.

Feed Stream 1
  422.0 g of n-BA
  347.5 g of EHA
  189.0 g of MMA
  25.0 g of AA
  12.3 g of a 35 wt % strength solution of photoinitiator A in THF
  Feed Stream 2
  41.7 g of IB
  0.4 g of TBEH
  Feed Stream 3
  16.7 g of IB
  2.4 g of TBEH

Example 8

Example 8 was carried out in a manner similar to that described in Example 7 except that instead of IB there was used MEK. A K alue of 48.8 was found.

Example 9

Example 9 was a repetition of Example 7 except that instead of the photoinitiator A the identical amount of photoinitiator B was used. The K value was found to be 48.6.

Example 10

Example 10 was a repetition of Example 7 except that instead of the photoinitiator A the identical amount of photoinitiator C was used. The K value was found to be 48.6.

Example 11

Example 5 was a repetition of Example 7 except that 24.6 g of a 35 wt % strength solution of photoinitiator A in THF were used. The K value was found to be 50.2.

Example 12

Example 12 was a repetition of Example 7 except that in the feed streams 2 and 3 instead of TBEH Wako V59 was used. The K value was found to be 48.5.

Example 13

In a reactor having a capacity of 2 L and provided with heating and cooling means and equipped with an anchor agitator, reflux condenser and evacuating and metering equipment
  115.0 g of IB
  59.5 g of feed stream 1 and
    3.3 g of feed stream 2 were used as initial batch at room temperature under a blanket of nitrogen and heated to 100° C. in closed apparatus without pressure compensation, with stirring. Starting concurrently, the residual amount of feed stream 1 was metered in at this temperature over a period of 3.5 hours and the residual amount of feed stream 2 over a period of 4 hours. 15 minutes after completion of feed 2, feed 3 was commenced, this being metered in over a period of 15 minutes. At the same time as feed stream 3 was metered, the temperature was raised to 115° C.

On conclusion of feed 3, polymerization was continued for another two hours at 115° C. The temperature was then lowered to 100° C. and the pressure carefully let down to atmospheric pressure, after which the solvent and other low-boiling components were removed by distillation by gentle application of vacuum to a final pressure of 10 mbar (absolute). The batch was then cooled to room temperature. There was obtained a clear, highly viscous polymer having a solids content of >99,9 wt %. The K value was found to be 50.1.

Feed Stream 1
  1117.0 g of n-BA
  59.1 g of AA
  11.5 g of a 35 wt % strength solution of photoinitiator A in THF
  Feed Stream 2
  65.8 g of IB
  1.3 g of TBEH
  Feed Stream 3
  19.7 g of IB
  2.6 g of TBEH

Example 14

In a reactor having a capacity of 2 L and provided with heating and cooling means and equipped with an anchor agitator, reflux condenser and evacuating and metering equipment
  115.0 g of IB
  59.5 g of feed stream 1 and
    3.3 g of feed stream 2 were used as initial batch at room temperature under a blanket of nitrogen and heated to 100° C. in closed apparatus without pressure compensation, with stirring. Starting concurrently, the residual amount of feed stream 1 was metered in at this temperature over a period of 3.5 hours and the residual amount of feed stream 2 over a period of 4 hours. 15 minutes after completion of feed 2, feed 3 was commenced, this being metered in over a period of 15 minutes. At the same time as feed stream 3 was metered, the temperature was raised to 115° C.

On conclusion of feed 3, polymerization was continued for another two hours at 115° C. The temperature was then lowered to 100° C. and the pressure carefully let down to atmospheric pressure, after which the solvent and other low-boiling components were removed by distillation by gentle application of vacuum to a final pressure of 10 mbar (absolute). The batch was then cooled to room temperature. There was obtained a clear, highly viscous polymer having a solids content of >99,9 wt %. The K value was found to be 50.5.

Feed Stream 1
1100.0 g of n-BA
55.1 g of AA
22.0 g of maleic anhydride (MA; >99,7 wt %, Lonza S.P.A.)
11.5 g of a 35 wt % strength solution of photoinitiator A in THF
Feed Stream 2
65.8 g of IB
1.3 g of TBEH
Feed Stream 3
19.7 g of IB
2.6 g of TBEH Example 15

In a reactor having a capacity of 2 L and provided with heating and cooling means and equipped with an anchor agitator, reflux condenser and evacuating and metering equipment
115.0 g of IB
59.5 g of feed stream 1 and
3.3 g of feed stream 2 were used as initial batch at room temperature under a blanket of nitrogen and heated to 100° C. in closed apparatus without pressure compensation, with stirring. Starting concurrently, the residual amount of feed stream 1 was metered in at this temperature over a period of 3.5 hours and the residual amount of feed stream 2 over a period of 4 hours. 15 minutes after completion of feed 2, feed 3 was commenced, this being metered in over a period of 15 minutes. At the same time as feed stream 3 was metered, the temperature was raised to 115° C.

On conclusion of feed 3, polymerization was continued for another two hours at 115° C. The temperature was then lowered to 100° C. and the pressure carefully let down to atmospheric pressure, after which the solvent and other low-boiling components were removed by distillation by gentle application of vacuum to a final pressure of 10 mbar (absolute). The batch was then cooled to room temperature. There was obtained a clear, highly viscous polymer having a solids content of >99,9 wt %. The K value was found to be 49.3.

Feed Stream 1
1043.0 g of n-BA
133.1 g of AA
22.0 g of a 35 wt % strength solution of photoinitiator A in THF
Feed Stream 2
65.0 g of IB
1.7 g of TBEH
Feed Stream 3
19.9 g of IB
2.6 g of TBEH Example 16

Example 16 was carried out in a manner similar to that described
in Example 15 except that the following feed streams were used:
Feed Stream 1
1000.0 g of n-BA
105.1 g of AA
72.0 g of MA
13.5 g of a 35 wt % strength solution of photoinitiator A in THF
Feed Stream 2
68.4 g of IB
1.7 g of TBEH
Feed Stream 3
19.7 g of IB
2.8 g of TBEH
The K value was found to be 48.6.

Example 17

In a reactor having a capacity of 2 L and provided with heating and cooling means and equipped with an anchor agitator, reflux condenser and evacuating and metering equipment
110.0 g of IB
59.0 g of feed stream 1 and
2.5 g of feed stream 2 were used as initial batch at room temperature under a blanket of nitrogen and heated to 100° C. in closed apparatus without pressure compensation, with stirring. Starting concurrently, the residual amount of feed stream 1 was metered in at this temperature over a period of 4 hours and the residual amount of feed stream 2 over a period of 4.5 hours. 15 minutes after completion of feed 2, feed 3 was commenced, this being metered in over a period of 15 minutes. At the same time as feed stream 3 was metered, the temperature was raised to 115° C.

On conclusion of feed 3, polymerization was continued for another two hours at 115° C. The temperature was then lowered to 100° C. and the pressure carefully let down to atmospheric pressure, after which the solvent and other low-boiling components were removed by distillation by gentle application of vacuum to a final pressure of 10 mbar (absolute). The batch was then cooled to room temperature. There was obtained a clear, highly viscous polymer having a solids content of >99,9 wt %. The K value was found to be 46.5.

Feed Stream 1
910.0 g of EHA
91.0 g of hydroxyethyl acrylate (≧98,5 Gew.-%, BASF AG)
22.2 g of a 35 wt % strength solution of photoinitiator A in THF
Feed Stream 2
35.8 g of IB 0.8 g of TBEH Feed Stream 3

21.7 g of IB 2.8 g of TBEH

The K value was found to be 48.6.

III Utilitarian Tests

The copolymers produced in Examples from 1 to 17 were subjected to utilitarian tests to examine their self-adhesive properties. The procedure was as follows:

a) Production of Test Strips

The copolymer to be tested was examined without the addition of tackifiers. For this purpose the copolymer was thinly applied to a commercial polyester film (Hostaphan RN 36 film) on a heated spreading bench at from 85° to 120° C. with a doctor blade and then cooled to room temperature. The radial screw clearance of the doctor blade was set to give a rate of copolymer application of from 19 to 21 g/m². Irradiation was effected with a CK radiator, sold by IST-Strahlentechnik Metz GmbH and having a power output of 75 mJ/sec×cm². For this purpose the coated film was laid on a travelling continuous web so that the coated film passed under the lamp at a distance of 10 cm and at a rate of 58 m/min. Irradiation took place in air. The films thus produced were cut up into tapes 2.5 cm wide and 25 cm long.

b) Test of Shear Strength (Similar to FINAT FTM 7)

Each strip was stuck to the marginal region of a test plate of high-grade steel such that a stick-on area of 12.5×12.5 mm² was obtained. 10 minutes after the strip had been stuck to the plate a 1000 g weight was fixed to the loose end of the strip and the test plate was hung vertically in a chamber having a constant temperature of 23° C. and a relative humidity of 50%. The time taken for the weighted tape to tear away from the plate is a measure of the shear strength, which is in turn a measure of cohesion. The more time required to break the adhesive bond, the greater the cohesion. Three separate tests were carried out on each polymer. The values given in Table 2 are averages of the results of said tests.

c) Test of the Peel Strength (Similar to FINAT FTM 1)

A test strip was stuck to a stainless steel test plate at 23° C. and 50% relative humidity.

Following a specified contact time of 24 hours, the tape was pulled off the plate with a tension tester at an angle of 180° and at a rate of 300 mm per minute. The required force is a measure of the adhesion. It is termed peel strength and is expressed in terms of newton per 2.5 cm (N/2.5 cm). The degree of adhesion is higher, the higher the value of the peel strength after the stated time. Three separate tests were carried out on each polymer. The values given in Table 2 are averages of the results of said tests.

TABLE 2

Summary of the shear strengths and peel strengths of the copolymers of Examples from 1 to 17

| Polymer of Example | Shear strength in minutes | Peel strength in N/2.5 cm after 24 hours |
|---|---|---|
| 1 | 135 | 10.2 |
| Comparison | 75 | 9.7 |
| 2 | 125 | 12.7 |
| 3 | 110 | 17.1 |
| 4 | 90 | 17.0 |
| 5 | 148 | 10.5 |
| 6 | 111 | 12.0 |
| 7 | 115 | 12.9 |
| 8 | 105 | 12.1 |
| 9 | 108 | 14.3 |
| 10 | 101 | 14.0 |
| 11 | 137 | 10.9 |
| 12 | 106 | 11.1 |
| 13 | 130 | 10.5 |
| 14 | 115 | 10.8 |
| 15 | 111 | 12.1 |
| 16 | 108 | 10.9 |
| 17 | 118 | 11.8 |

As is clearly visibly from Table 2, the hot-melt adhesives of the invention exhibit distinctly higher shear strengths (cohesion) than a self-adhesive during the production of which a photoinitiator is used which is not of the invention. Greatly improved are also the peel strengths (adhesion) as measured after a period of 24 hours.

The invention claimed is:

1. A process for the production of a UV-crosslinkable copolymer, which comprises free-radically polymerizing a mixture of ethylenically unsaturated monomers comprising a free-radically copolymerizable acetophenone or benzophenone derivative comprising components a), b) and c) obtained by reaction of
   a) a (meth)acrylic compound exhibiting at least one isocyanate-reactive group, compound a), with
   b) a compound having at least two isocyanate groups, compound b), and
   c) an acetophenone or benzophenone derivative exhibiting at least one isocyanate-reactive group, compound c).

2. A process as defined in claim 1, wherein the compound a) is a (meth)acrylic compound of formula (I)

$$H_2C=CR^1—C(=O)—X—R^2(—Y)_\pi \qquad (I),$$

in which the substituents and indices have the following meanings:

$R^1$ denotes —H, —CH$_3$,

X denotes —O—, —NH—, —NR$^3$— or —S—, $R^3$ denotes linear or branched $C_1$-$C_6$ alkyl, $R^2$ denotes a ($\pi$+1)-binding, optionally substituted linear or branched $C_1$-$C_{12}$ alkyl group, or a $C_3$-$C_{12}$ cycloalkyl group, optionally substituted, or a $C_6$-$C_{10}$ aryl group, optionally substituted, Y denotes —OH, —NH$_2$, —NHR$^3$, or —SH, $\pi$ is a number from 1 to 5, while the structural element —R$^2$(—Y), in formula (I) can alternatively be a group of formula (II), (III), or (IV)

$$-(EO)_k—(PO)_l—H \qquad (II),$$

$$—(PO)_l-(EO)_k—H \qquad (III),$$

$$-(EO_k/PO_l)—H \qquad (IV),$$

in which

EO stands for a —CH$_2$—CH$_2$—O group,

PO stands for a —CH$_2$—CH(CH$_3$)—O or a —CH(CH$_3$)—CH$_2$—O group and k and l are numerical values of from 0 to 15, but k and l are not both 0.

3. A process as defined in claim 1, wherein compound b) is a compound of formula (V)

$$Q(—NCO)_\pi \quad (V),$$

in which
Q is a linear or branched $C_3$-$C_{16}$ alkane compound, optionally substituted by 1, 2, or 3 halogens, oxo, ester, or alkoxy groups, or
a $C_6$-$C_{14}$ aromatic compound, optionally substituted by 1, 2, or 3 halogens, or $C_{1-6}$ alkyl, oxo, ester, or alkoxy groups, or
a $C_3$-$C_{16}$ cycloalkane compound, optionally substituted by 1, 2, or 3 halogens, $C_1$-$C_6$ alkyl, oxo, ester, or alkoxy groups, or
an arylalkyl compound containing from 6 to 10 carbons in the aryl moiety and from 1 to 6 carbon atoms in the alkyl moiety, optionally substituted by 1, 2, or 3 halogens, oxo, ester, or alkoxy groups,
and $\lambda$ is a number $\geq 9$.

4. A process as defined in claim 1, wherein compound c) is an acetophenone or benzophenone derivative of formula (VI)

$$A-C(=O)—B-D \quad (VI),$$

in which the substituents have the following meaning:
A denotes $C_1$-$C_3$ alkyl, $C_6$-$C_{10}$ aryl, optionally substituted by 1, 2, or 3 halogens, $C_1$-$C_6$ alkyl, ester, or alkoxy groups, and aralkyl containing from 6 to 10 carbons in the aryl moiety and from 1 to 6 carbons in the alkyl moiety,
B denotes $C_6$-$C_{10}$ arylene, optionally substituted by 1, 2, or 3 halogens, $C_1$-$C_6$ alkyl, ester, or alkoxy groups and
D denotes —$NH_2$, —$NHR^3$, OH, SH, or a structural element —X—$R^2$(—Y)$_\pi$, the variants having the meanings stated for formula (I).

5. A process as defined in claim 2, wherein, in compound a), Y denotes —OH and $\pi$ denotes 1, in compound b), $\lambda$ denotes 2, and, in compound c), A denotes methyl or phenyl, B denotes 1,4-phenylene, and D denotes —O—$CH_2CH_2$—OH.

6. A process as defined in claim 2, wherein the ratio of the number of mols of compound b) to the product of the number of mols of compound a) and the number $\pi$ is from 0.8:1 to 1:0.8.

7. The process of claim 1, wherein said acetophenone or benzophenone derivative is present in a an amount of 0.1 to 10 wt. % based on the total amount of monomers.

8. The process of claim 1, wherein, said mixture of ethylenically unsaturated monomers comprises 0.1 to 15 wt. % of $C_{3-6}$-monoethylenically unsaturated carboxylic acids.

9. The process of claim 1, wherein, said UV-crosslinkable copolymer has a K value of from 10 to 150.

10. The process of claim 1, wherein, said UV-crosslinkable copolymer has a glass transition temperature of from −70 to 150° C.

11. The process of claim 1, wherein, said UV-crosslinkable copolymer has a glass transition temperature of <0° C.

12. The process of claim 1, wherein, said UV-crosslinkable copolymer has a glass transition temperature of 0 to 100° C.

13. The process of claim 1, wherein, said UV-crosslinkable copolymer has a glass transition temperature of from 20 to 80° C.

* * * * *